(12) United States Patent
Hong et al.

(10) Patent No.: US 11,062,482 B2
(45) Date of Patent: Jul. 13, 2021

(54) CODING SCHEMES FOR VIRTUAL REALITY (VR) SEQUENCES

(71) Applicant: ARRIS Enterprises LLC, Suwanee, GA (US)

(72) Inventors: Seungwook Hong, San Diego, CA (US); Limin Wang, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 84 days.

(21) Appl. No.: 15/782,107

(22) Filed: Oct. 12, 2017

(65) Prior Publication Data
US 2018/0101967 A1   Apr. 12, 2018

Related U.S. Application Data

(60) Provisional application No. 62/407,108, filed on Oct. 12, 2016.

(51) Int. Cl.
*G06T 9/00*       (2006.01)
*H04N 5/232*    (2006.01)
(Continued)

(52) U.S. Cl.
CPC .............. *G06T 9/00* (2013.01); *G06T 3/0037* (2013.01); *H04N 5/23238* (2013.01);
(Continued)

(58) Field of Classification Search
CPC ....... G06T 9/00; G06T 3/0037; H04N 19/503; H04N 19/51; H04N 19/55; H04N 19/597; H04N 5/23238
See application file for complete search history.

(56) References Cited

U.S. PATENT DOCUMENTS

| 8,532,178 B2 | 9/2013 | Moon et al. |
| 2016/0112704 A1 | 4/2016 | Grange et al. |
| 2017/0230668 A1* | 8/2017 | Lin ...................... H04N 19/563 |

FOREIGN PATENT DOCUMENTS

WO     2015/197818 A1    12/2015

OTHER PUBLICATIONS

PCT International Search Report & Written Opinion, Re: Application No. PCT/US2017/056336, dated Jan. 22, 2018.
(Continued)

*Primary Examiner* — Anner N Holder
(74) *Attorney, Agent, or Firm* — Chernoff, Vilhauer, McClung & Stenzel, LLP

(57) ABSTRACT

An improved method for coding video is provided that includes Virtual Reality (VR) sequences that enables more efficient encoding by organizing the VR sequence as a single 2D block structure. In the method, reference picture and subpicture lists are created and extended to account for coding of the VR sequence. To further improve coding efficiency, reference indexing can be provided for the temporal and spatial difference between a current VR picture block and the reference pictures and subpictures for the VR sequence. Further, because the reference subpictures for the VR sequence may not have the proper orientation once the VR sequence subpictures are organized into the VR sequence, reorientation of the reference subpictures is made so that the reference subpicture orientations match the current VR subpicture orientations.

7 Claims, 6 Drawing Sheets

(51) Int. Cl.
*H04N 19/51* (2014.01)
*H04N 19/55* (2014.01)
*H04N 19/503* (2014.01)
*H04N 19/597* (2014.01)
*G06T 3/00* (2006.01)

(52) U.S. Cl.
CPC ........... *H04N 19/503* (2014.11); *H04N 19/51* (2014.11); *H04N 19/55* (2014.11); *H04N 19/597* (2014.11)

(56) References Cited

OTHER PUBLICATIONS

J. Sauer, et al., "Geometry correction for motion compensation of planar-projected 360VR video", 4th JVET Meeting, (The Joint Video Exploration Team of ISO/IEC JTC1/SC29/WG11 and ITU-T SG.16), No. JVET-D0067, Oct. 5, 2016.

M. Zhou, et al., "AHG8: A study on compression efficiency of cube projection", 4th JVET Meeting (The Joint Video Exploration Team of ISO/IEC JTC1/SC29/WG11 and ITU-T SG.16), No. JVET-D0022, Aug. 23, 2016.

S. Oh, et al., "Signaling of VR Video Information in ISOBMFF", 115th MPEG Meeting (Motion Picture Expert Group or ISO/IEC JTC1/SC29/WG11), No. m38565, May 25, 2016.

S. Watanabe, et al., "DASH: Concepts and Descriptions Proposal on Spatial Relationship Description (CE SRD)", 106th MPEG Meeting (Motion Picture Expert Group or ISO/IEC JTC1/SC29/WG11), No. m31309, Oct. 23, 2013.

Y.-K. Wang, et al., "Viewport dependent processing in VR: partial video decoding", 115th MPEG Meeting (Motion Picture Expert Group or ISO/IEC JTC1/SC29/WG11), No. m38559, dated May 25, 2016.

European Office Action Re: Application No. 17787858.4.

* cited by examiner

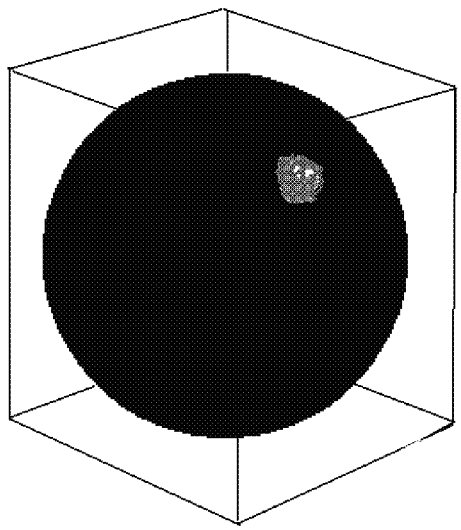
FIG. 1
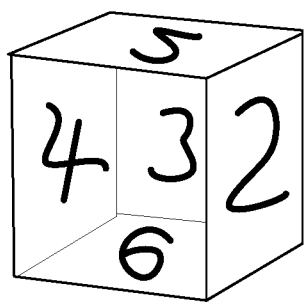
FIG. 2
FIG. 3
FIG. 4

CODING SCHEMES FOR VIRTUAL REALITY (VR) SEQUENCES

CLAIM FOR PRIORITY

This Application claims priority under 35 U.S.C. § 119(e) from earlier filed U.S. Provisional Application Ser. No. 62/407,108 filed on Oct. 12, 2016 and incorporated herein by reference in its entirety.

BACKGROUND

Technical Field

The present invention relates to data structures used in coding Virtual Reality (VR) streams using either Advanced Video Coding (AVC) or High Efficiency Video Coding (HEVC or H-265). More particularly, the present system relates to reference lists and indexing for reference pictures and subpictures used in coding VR pictures for AVC or HEVC.

Related Art

VR (Virtual Reality) is the term describing a three-dimensional, computer generated environment, which can be explored and interacted with by a person. An example of use of VR is for 360 degree vision which could be achieved by special device with a Head Mounted Display (HMD) to enable a user to view all around. To cover the 360 degrees of vision in VR, a few projection formats have been proposed and used.

One VR format is cube projection which is illustrated using FIG. 1. In FIG. 1, a sphere is shown inside a cube to illustrate how the surface of the sphere can be projected out onto the surface of the cube. Cube projection maps can be used to project a map from a spherical globe out onto the surfaces of the cube. The map or other items on the sphere are projected onto the six sides of the cube, each cube surface being a two dimensional square.

FIG. 2 illustrates the surfaces of the cube all provided onto a three dimensional surface. The surfaces of the cube in FIG. 2 are numbered to enable understanding conversion of the cube layout into the two dimensional layout of FIGS. 3 and 4. In FIG. 3, a 4×3 cube layout is shown, while in FIG. 4 a 3×2 layout is shown. The 4×3 and 3×2 cube layouts of respective FIGS. 3 and 4 are basically the same, but with different planar configuration for faces of the cube. In both FIGS. 3 and 4, the VR projection has 6 surfaces.

Two other VR formats other than the cube projection are described, although other formats might be used. One such VR format is the Equal Rectangular Projection (ERP) which maps meridians of a map globe onto a two dimensional surface with equally spaced vertical straight lines, and with equally spaced horizontal straight lines. This enables longitude and latitude lines on a globe to be equally spaced apart on the cube. Projection onto the surface of the cube still results in 6 surfaces that can be laid out as shown in FIGS. 3 and 4.

Another VR format is the Equal Area Projection (EAP) which maps meridians of a map globe onto a two dimensional surface with equally spaced vertical straight lines, and with circles of latitude mapped directly to horizontal lines even if they are not equally spaced. Again, projection onto the surface of the cube still results in 6 surfaces that can be laid out as shown in FIGS. 3 and 4.

The existing video coding standards, such as Advanced Video Coding (AVC) or High Efficiency Video Coding (HEVC), may be used to code VR sequences. All those video coding standards are based upon a hybrid of temporal and spatial coding. That is, the coding uses motion estimation and compensation (ME/MC) to remove the temporal redundancy between consecutive pictures, and spatial prediction and spatial transform to remove the correlation among the pixels within a picture.

For ME/MC, the past-coded pictures are used as reference pictures for the current and future pictures. A block in a current picture may find a best-matched (prediction) block in one or more reference pictures. Specifically, AVC and HEVC have two reference lists, which hold some of the past-coded pictures for future reference. A block in a current picture may find a prediction block in one of the pictures in each list of references.

It is desirable to provide improvements for coding when VR formats are used.

SUMMARY

Embodiments of the invention provide a method for coding video that includes VR sequences that enable more efficient encoding by organizing the VR sequence as a single 2D block structure. Reference picture and subpicture lists are created and extended to account for coding of the VR sequence. To further improve coding efficiency, reference indexing can be provided for the temporal and spatial difference between a current VR picture block and the reference pictures and subpictures for the VR sequence. Because the reference subpictures for the VR sequence may not have the proper orientation once the VR sequence subpictures are organized into the VR sequence, embodiments of the present invention allow for reorientation of the reference subpictures so that the reference subpictures and VR subpictures are orientated the same.

For embodiments of the present invention, the VR sequence can be treated as a regular 2D sequence. That is, each VR picture is treated as a single 2D picture. In this case, all the existing video coding standards can be applied to the single VR sequence directly. Since a VR picture in a cube of 4×3 or 3×2 includes six subpictures at each time instance, the six subpictures. The six VR picture subpictures can be treated as six tiles within a picture, similar to the concept defined in HEVC.

One embodiment of the present invention provides a method for coding of video with VR pictures, with the coding including a reference list of past-coded pictures and subpictures. In the method, a current VR picture in the VR pictures of the video is defined to include six subpictures as represented by the cube of FIG. 3. Next, at least one reference list is built for the current VR picture, wherein the at least one reference list holds a past-coded version of the VR picture as a reference picture as well as the past-coded subpictures of the current VR picture as reference subpictures. Next, the reference list is divided into two parts with the past-coded pictures provide in a first reference list. Past-coded subpictures are then provided in a second reference list. Next, motion vector prediction blocks are defined using the reference subpictures from the first and second reference list for the current VR picture. Finally, the motion vector prediction blocks are used in coding that are also sent to the decoder.

Another embodiment of the present invention provides a method for coding of video with VR pictures that includes indexing of reference subpictures relative to current subpictures to improve coding efficiency. In this embodiment also, a current VR picture in the VR pictures of the video is defined to include six subpictures. Next, a reference picture and reference subpictures are defined for the current VR picture. Then a reference list and index is built for the current VR picture and subpictures relative to the reference picture and subpictures. The indexing of subpictures is made according to temporal and spatial distances from a current block in one of the current subpictures to a reference block in the reference subpictures. The reference list and index created is then used in coding of the video and sent to a decoder.

A further embodiment of the present invention provides a method for coding of video with VR pictures that includes the ability to change subpicture orientation to enable efficient encoding of the VR pictures. In this embodiment, like the embodiments above, a current VR picture in the VR pictures of the video is defined to include six subpictures. Next, the subpictures for a reference picture for the current VR picture is identified. Finally, the subpictures of the reference picture are rotated to match the orientation of the subpictures of the current VR picture.

BRIEF DESCRIPTION OF THE DRAWINGS

Further details of the present invention are explained with the help of the attached drawings in which:

FIG. 1 illustrates how for a VR sequence a 360 degree spherical object can be mapped onto surfaces of a cube;

FIG. 2 illustrates the numbered surfaces of the cube that has been mapped with a VR sequence from an internal spherical structure;

FIG. 3 shows organization of the cube surfaces of FIG. 2 into a 4×3 two dimensional structure for coding of the VR sequence;

FIG. 4 shows organization of the cube surfaces of FIG. 2 into a 3×2 two dimensional structure for coding of the VR sequence;

DETAILED DESCRIPTION

A VR sequence in a video can be treated as a regular 2D sequence with six subpictures for the embodiments of the invention described herein. That is, each VR picture is treated as a single 2D picture and coding standards such as AVC and HEVC can be applied to the single VR sequence directly. The VR picture can be a 4×3 or 3×2 breakdown of a cube into six subpictures at each time instance, as illustrated in FIGS. 3 and 4. The six VR picture subpictures can be treated as six tiles within a picture, similar to the concept defined in HEVC.

To accomplish motion estimation and compensation (ME/MC) for embodiments of the present invention, the concept of reference pictures lists, reference indexing and an orientation of references relative to a current picture can be provided for a VR sequence for embodiments of the present invention. A description of each of these concepts is provided to follow.

A. Reference Lists

The concept of reference pictures and lists can be extended for a VR sequence. Similar to AVC and HEVC, for a block in a current subpicture within a current picture, reference pictures can be provided and reference lists built to enable ME/MC. Reference pictures can be built from the past-coded pictures of subpictures as well as the past-coded subpictures of the current picture. A listing of these reference pictures can further be created.

The past-coded pictures can be included in at least one reference list, similar to AVC and HEVC. The past-coded subpictures for the current picture may be included in a second reference list.

Now for blocks, consider a current block in a current subpicture within a current picture. For the current block the reference prediction block can be found in one of the reference subpictures per reference list. One of reference subpictures in which the reference prediction block is found can be in one of the past-coded pictures in a different picture time instance than the current time instance forming the reference.

Figure 5:
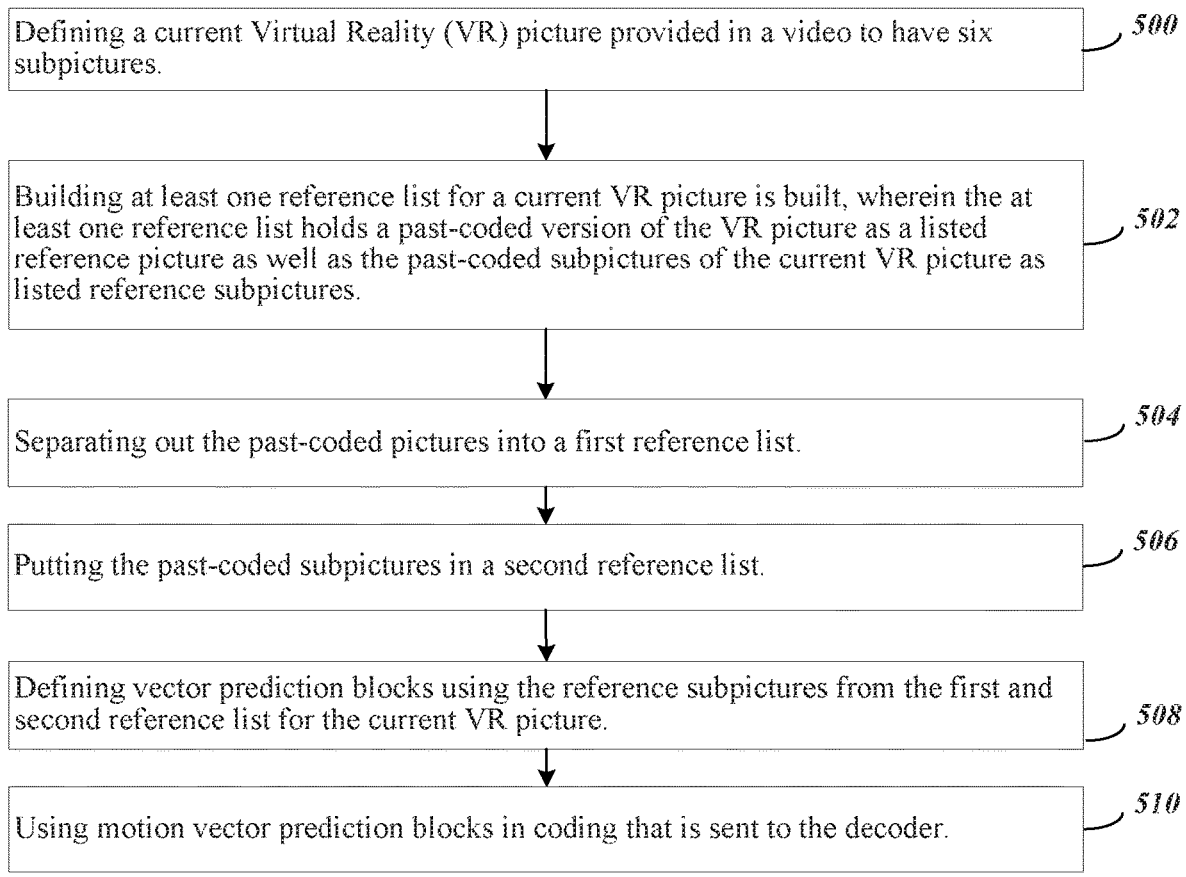
FIG. 5 provides a flowchart with steps according to embodiments of the present invention for coding video using reference picture and subpicture lists to account for a VR sequence.

FIG. 5 provides a flowchart with steps according to embodiments of the present invention for coding video using reference picture and subpicture lists to account for a VR sequence. In a first step 500, the method defines a current VR picture provided in a video to have six subpictures. Next in a step 502, at least one reference list for the current VR picture is built, wherein the at least one reference list holds a past-coded version of the VR picture as well as the past-coded subpictures of the current VR picture. In step 504, the past-coded pictures are separated out into a first reference list. In step 506, the past-coded subpictures are included in a second reference list. In step 508, motion vector prediction blocks are defined using the reference subpictures from the first and second reference list for the current VR picture. Finally, in step 510 the motion vector prediction blocks are used in coding that is sent to the decoder.

B. Reference Indexing

Due to the fact that the closer the reference picture and subpictures are to the current subpicture temporally and spatially, the higher the correlation between the reference picture and subpictures and the current picture, the reference pictures and subpictures for embodiments of the present invention may be indexed according to their temporal and spatial distance to the current subpicture.

Embodiments of the present invention provide for a default reference picture/subpicture index order. In particular, for a current block in a current subpicture for a current picture, a reference picture and subpictures in a reference picture list are indexed according to its temporal and spatial distances to the current block in the current subpicture of the current picture. In other words, the closest reference picture/subpicture to the current block in the current subpicture of the current picture temporally and spatially is assigned the index of 0, the second closest reference picture/subpicture is assigned the index of 1, and so on.

Figure 6:
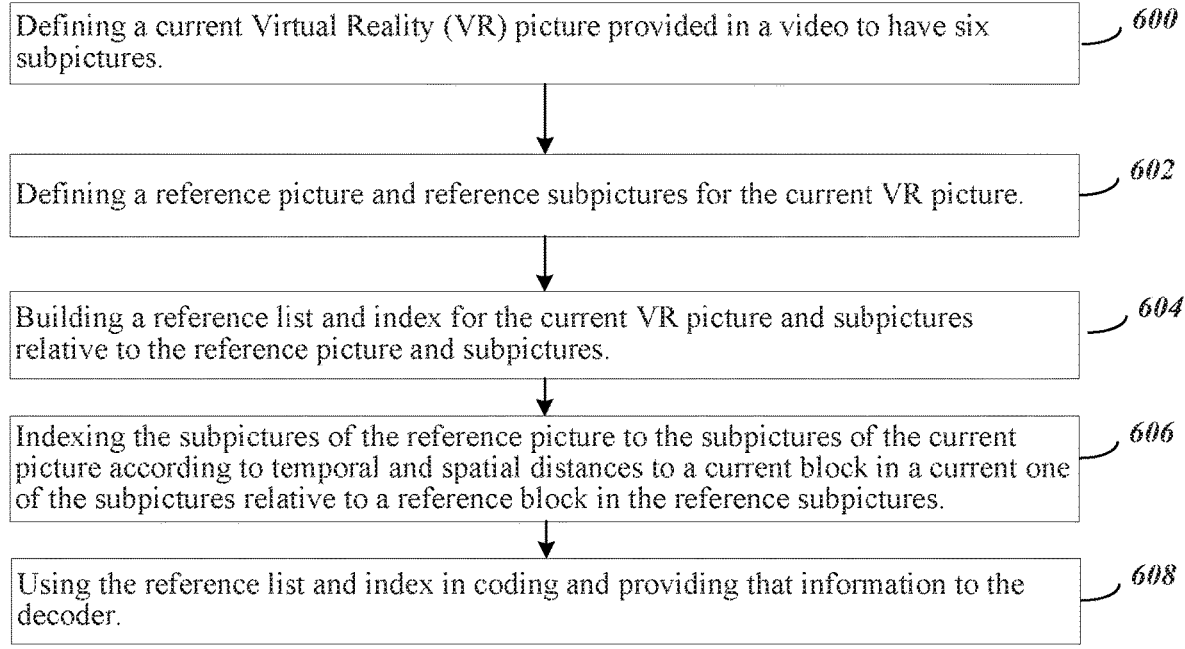
FIG. 6 provides a flowchart with steps indicating how reference subpicture indexing is provided according to embodiments of the present invention.

FIG. 6 provides a flowchart with steps indicating how reference subpicture indexing is provided according to embodiments of the present invention. In particular, the method illustrated by the flowchart of FIG. 6 provides for coding a video containing virtual reality (VR) pictures that includes indexing of reference subpictures relative to current subpictures. In a first step 600, a current VR picture in the VR pictures is defined to include six subpictures. Next in step 602, a reference picture and reference subpictures for the current VR picture is defined. In step 604 a reference list and index is built for the current VR picture and subpictures relative to the reference picture and subpictures. In step 606, indexing of the subpictures of the reference picture to the subpictures in the current picture is provided according to temporal and spatial distances to a current block in a current one of the subpictures relative to a reference block in the reference subpictures. Finally, in step 608, the reference list and index are used in coding that is sent to the decoder.

In embodiment for providing a reference list index, a reference subpicture is assigned a temporal index, i, and a spatial index, j, or a combination of temporal and spatial indexes, i+j. The temporal index, i, can be determined by the temporal distance between the reference picture and the current picture, i.e., the closer, the smaller the index. The spatial index, j, can be determined by the spatial distance between the reference subpicture in the reference picture and the current block collocated in the reference picture.

Figure 7:
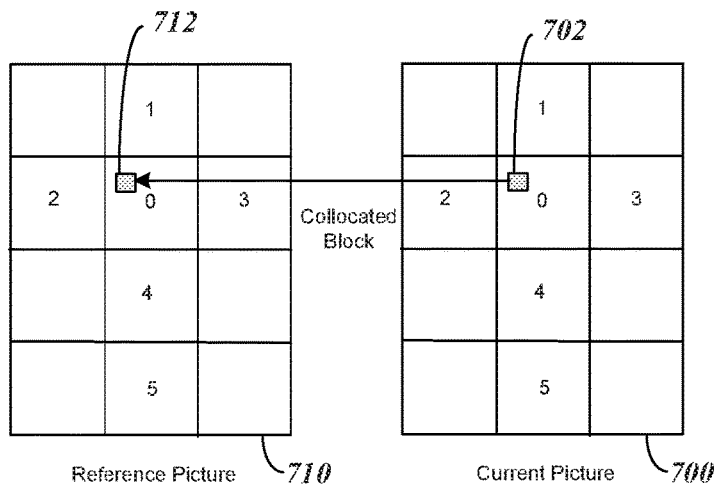
FIG. 7 illustrates pictures used to create a reference list index with a reference subpicture assigned a temporal index, i, and a spatial index, j.

FIG. 7 illustrates pictures used to create a reference list index with a reference subpicture assigned a temporal index, i, and a spatial index, j. In FIG. 7, a current block 702 in gray color is shown in subpicture 0 of a current picture 700. As seen, in the middle of FIG. 7, the closest subpicture to the collocated block 712 of the current block in a reference picture 710 is subpicture 2. Hence, for the current block, subpicture 2 in any reference picture of any reference list will be assigned a spatial reference index of j=0. Subpicture 1 is the second closet subpicture, and so, it will be assigned the spatial reference index of j=1. For this example, for the current block in subpicture 0 of the current picture, the spatial reference indexes of j=0, 1, 2, 3, 4, and 5 will respectively be assigned to subpictures 2, 1, 4, 3, and 5 of any reference picture of any reference list.

C. Subpicture Rotation

Figure 8:
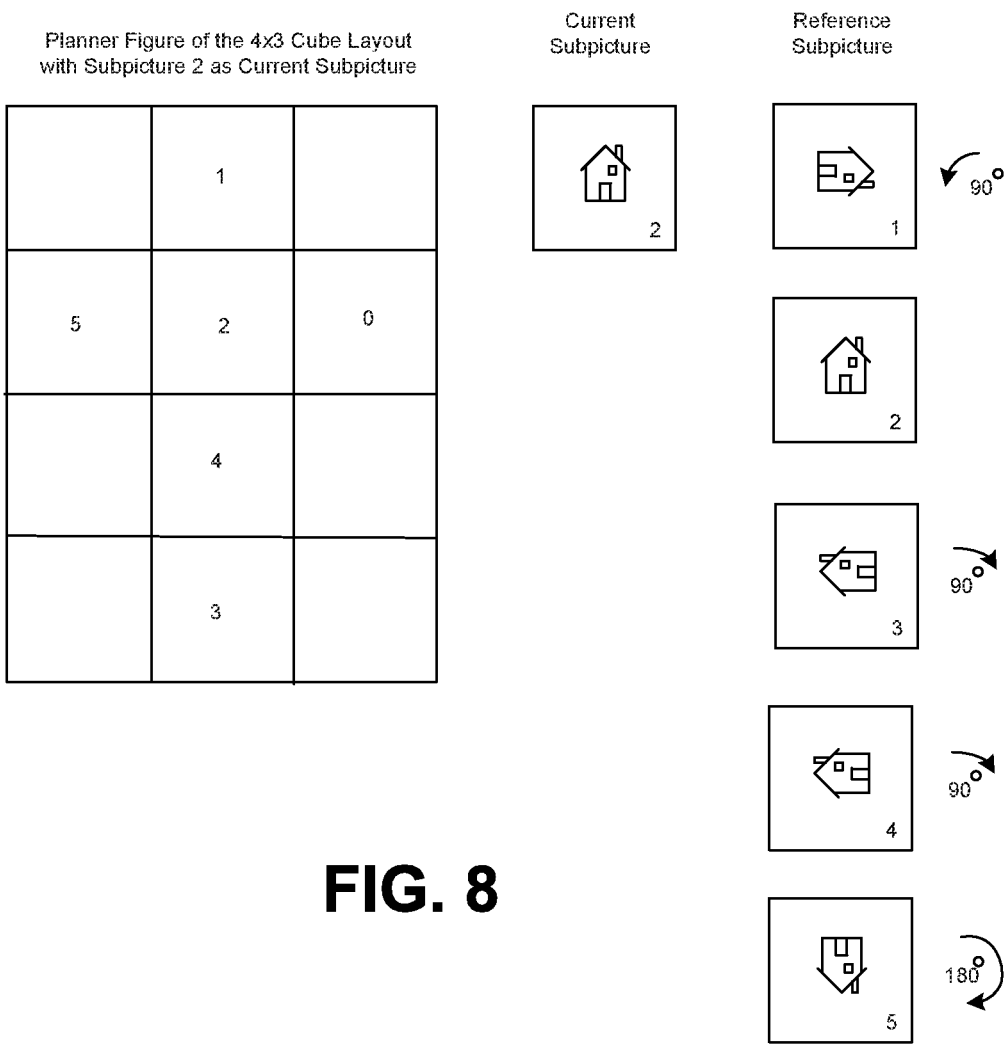
FIG. 8 shows how the six subpictures in a reference picture are rotated for a current subpicture 2.
Figure 9:
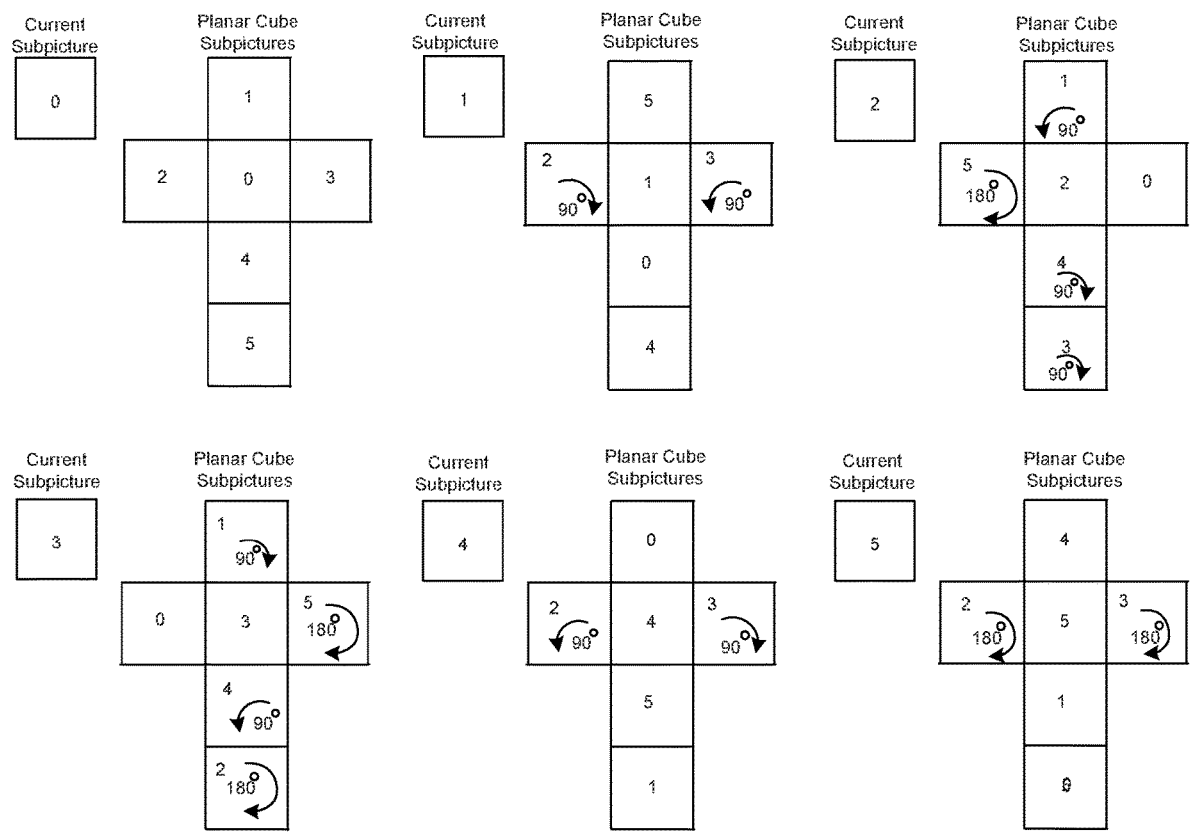
FIG. 9 shows how subpictures of a reference picture are rotated to have the same orientation with the current picture ranging from subpicture 0 through 5.

Not all the subpictures in a reference picture have the same orientation as the current subpicture of a current VR picture. To enable coding of the VR picture efficiently, the orientation of the six subpictures making up the VR picture that is made up of arranged faces of a cube should be organized to have the same orientation irrespective of arrangement of the cube faces. FIG. 8 shows how the six subpictures in a reference picture are rotated for a current subpicture 2. A seen, in this example, subpicture 1 needs to be rotated by 90 degree counterclockwise, subpicture 4 to be rotated 90 degree counterclockwise and subpicture 5 needs to be rotated by 180 degree clockwise. FIG. 9 shows how subpictures of a reference picture are rotated to have the same orientation with the current subpicture ranging from picture 0 through 5.

Figure 10:
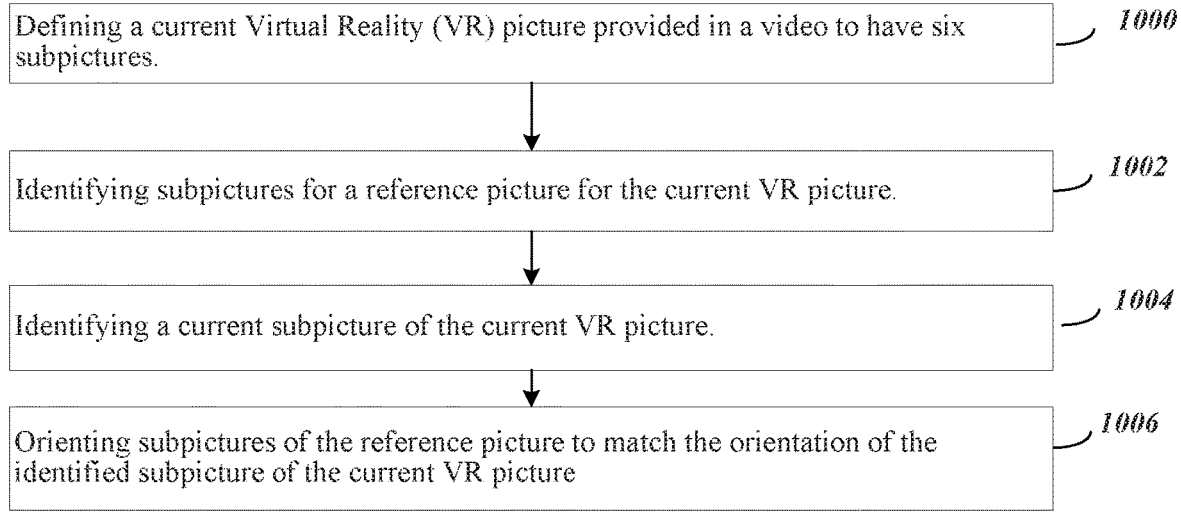
FIG. 10 provides a flowchart with steps showing how VR reference subpicture orientation is changed so that the orientation matches the current subpicture.

Accordingly, embodiments of the present invention provide for the subpictures of a reference picture to be rotated as shown in FIG. 9 accordingly so that they can have the same orientation as the current subpicture, before any prediction is performed. FIG. 10 provides a flowchart with steps showing how VR reference subpicture orientation is changed so that the orientation matches the current subpicture. In a first step, 1000, a current VR picture in the VR pictures is defined to include six subpictures. Next in step 1002, subpictures for a reference picture for the current VR picture are identified. In step 1004 a current subpicture of the current VR picture is identified. Finally, in step 1006 subpictures of the reference picture are oriented to match the orientation of the current subpicture of the current VR picture.

For better temporal and spatial prediction, the subpictures in a reference picture are rotated and rearranged accordingly so that the spatial content transition from a subpicture to its neighbor subpictures within the reference picture can be continuous and smooth. It is noted that in addition with rotation so that arrangement of subpictures of the current and reference pictures are the same, the spatial reference index, j, may not be necessary as the reference picture of six subpictures can be treated as one single picture in the reference list.

Figure 11:
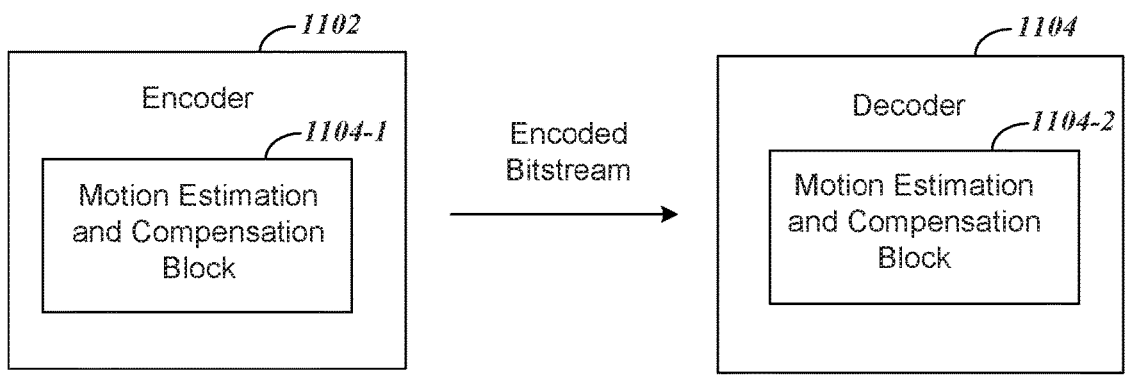
FIG. 11 shows an encoder and decoder that can be configured to perform encoding and decoding with VR pictures according to embodiments of the present invention.

FIG. 11 shows an encoder 102 and decoder 104 that can be configured to perform encoding and decoding with VR pictures according to embodiments of the present invention. Motion estimation and motion compensation is performed using information from embodiments of the present invention with encoder 102 and decoder 1104 using a process of determining a motion vector (MV) for a current unit of video. For example, the motion estimation process searches for a best match prediction for a current unit block of video (e.g., a prediction block) over reference pictures. Motion compensation is then performed by subtracting a reference unit pointed to by the motion vector from the current unit of video.

To perform motion estimation and compensation, encoder 1102 and decoder 1104 include motion estimation and compensation blocks 1104-1 and 1104-2, respectively. For bi-directional prediction, the motion estimation and compensation blocks 1104-1 and 1104-2 can use a combined bi-directional reference unit in the motion compensation process for the current unit.

For the encoder 1102 and decoder 1104 of FIG. 11, embodiments of the present invention contemplate that software to enable them to perform functions described to follow for the present invention is provided in a memory. The encoder 1102 and decoder 1104 are further contemplated to include one or more processors that function in response to executable code stored in the memory to cause the processor to perform the functions described.

Although the present invention has been described above with particularity, this was merely to teach one of ordinary skill in the art how to make and use the invention. Many additional modifications will fall within the scope of the invention as that scope is defined by the following claims.

What is claimed:

1. A method of coding a video containing virtual reality (VR) pictures that includes a reference list of past-coded pictures and subpictures, the method comprising:

defining a current VR picture in the VR pictures as six subpictures;

building at least one reference list for the current VR picture, wherein the at least one reference list holds a reference picture made from a temporally offset past-coded version of the current VR picture as well reference pictures made from temporally concurrent past-coded subpictures of the current VR picture;

including the past-coded pictures in a first reference list;

including the past-coded subpictures in a second reference list;

defining motion vector prediction blocks using reference subpictures from the first and second reference list for the current VR picture; and using the motion vector prediction blocks in coding that is sent to the decoder.

2. The method of claim 1, further comprising:

building a reference index for the current VR picture and subpictures relative to the reference picture and subpictures;

indexing the subpictures of the reference picture to the subpictures in the current picture according to temporal and spatial distances to a current block in a current one of the subpictures to a reference block in the reference subpictures; and using the reference list and index in coding that is sent to the decoder.

3. The method of claim 2, wherein for the current block in a current picture, a reference subpicture is assigned a temporal index i and a spatial index j or a combination of temporal and spatial indexes, i+j, wherein the temporal index i can be determined by the temporal distance between the reference picture and the current picture, and wherein the spatial index j can be determined by the spatial distance between the reference subpicture and the current subpicture block.

4. A method of coding a video containing virtual reality (VR) pictures that includes indexing of reference subpictures relative to current subpictures, the method comprising:

defining a current VR picture in the VR pictures as six subpictures;

defining a reference picture temporally offset from the current VR picture and reference subpictures temporally concurrent with the current VR picture building a reference list and index for the current VR picture and subpictures relative to the reference picture and subpictures;

indexing subpictures of the reference picture to the subpictures in the current VR picture according to temporal and spatial distances to a current block in a current one of the subpictures; and using the reference list and index in coding that is sent to the decoder.

5. The method of claim 4, wherein for the current block in a current picture, a reference subpicture is assigned a temporal index i and a spatial index j or a combination of temporal and spatial indexes, i+j, wherein the temporal index i can be determined by the temporal distance between the reference picture and the current picture, and wherein the spatial index j can be determined by the spatial distance between the reference subpicture and the current subpicture block.

6. The method of claim 4, wherein a closest reference subpicture to the current block in the current subpicture of the current picture temporally and spatially is assigned the index of 0 in the reference picture index, and the second closest reference subpicture is assigned the index of 1 in the reference picture index.

7. The method of claim 4, further comprising:

identifying a current subpicture of the current VR picture; and rotating the subpictures of the reference picture to match the orientation of the subpictures of the current VR picture.

* * * * *